United States Patent
Codina Guila

(10) Patent No.: US 9,803,673 B2
(45) Date of Patent: Oct. 31, 2017

(54) CONSTRUCTIVE DISPOSAL APPLIED IN MECHANICAL EXPANSION FIXER FOR METAL STRUCTURES OR THE LIKE

(71) Applicant: Ancora Chumbadores Ltda, Sao Paulo (BR)

(72) Inventor: Carlos Alberto Codina Guila, Sao Paulo (BR)

(73) Assignee: Ancora Chumbadores Ltda., San Paulo (BR)

( * ) Notice: Subject to any disclaimer, the term of this patent is extended or adjusted under 35 U.S.C. 154(b) by 0 days.

(21) Appl. No.: 14/887,654

(22) Filed: Oct. 20, 2015

(65) Prior Publication Data

US 2016/0108947 A1    Apr. 21, 2016

(30) Foreign Application Priority Data

Oct. 20, 2014    (BR) ........................... 20 2014 026188

(51) Int. Cl.
*F16B 13/06* (2006.01)
*F16B 19/10* (2006.01)

(52) U.S. Cl.
CPC ........ *F16B 13/063* (2013.01); *F16B 19/1072* (2013.01); *F16B 13/065* (2013.01)

(58) Field of Classification Search
CPC ...... F16B 13/06; F16B 13/063; F16B 13/065; F16B 13/0858; F16B 19/1072

(Continued)

(56) References Cited

U.S. PATENT DOCUMENTS 462,601 A * 11/1891 Thinnes ................ F16B 13/066
411/53
674,074 A * 5/1901 Bennentt ............... F16B 13/066
16/39

(Continued)

FOREIGN PATENT DOCUMENTS

CN   201520815301.X   10/2015
GB       2421554 A     6/2006

(Continued)

*Primary Examiner* — Roberta Delisle
(74) *Attorney, Agent, or Firm* — Kramer Amado, P.C.

(57) ABSTRACT

"CONSTRUCTIVE DISPOSAL APPLIED IN MECHANICAL EXPANSION FIXER FOR METAL STRUCTURES OR THE LIKE", which comprises a kit of pieces which form the mechanical expansion fixer (1), it has a hexagonal head (2) and a cylindrical body (3) endowed with full thread (4), has flat washer (5) and a jacket (6) in low-carbon steel; also on the head of the jacket (6) has a hexagonal (7) to ensure that the jacket does not rotate during mounting and tightening, which provides a wide contact area option to use the key that holds the fixer (A and B) in this way, it is not necessary to position it in the hole in a specific way, ensuring agility in the application; cone guided (8) is pre-assembled with the assembly being threaded in the thread base of the fixer (1), there is a unique locking system of guides (9), these guides fit into the openings or slots of jacket (10) and prevent the cone to rotate false in the jacket (6), as the head of the hexagon socket (7) when locked with a fixed key or star prevents this condition, this also applies in situations in which the level of friction between the fixer (1) and the base material is reduced, so there is a strong and rigid fixation between the metallic hollow profiles (11) and the fixer (1).

3 Claims, 4 Drawing Sheets

(58) Field of Classification Search
USPC .................. 411/35, 44, 46, 49, 53, 57.1, 71
See application file for complete search history.

(56) References Cited

U.S. PATENT DOCUMENTS

| | | | | |
|---|---|---|---|---|
| 679,363 | A * | 7/1901 | Church | F16B 13/066 411/53 |
| 1,276,708 | A * | 8/1918 | Bair | F16B 13/066 411/53 |
| 3,082,657 | A * | 3/1963 | Fischer | C07C 311/53 411/42 |
| 3,379,089 | A * | 4/1968 | Williams | E21D 21/00 411/46 |
| 3,623,396 | A * | 11/1971 | Mortensen | F16B 13/066 411/46 |
| 4,100,834 | A † | 7/1978 | Harris | |
| 4,650,384 | A * | 3/1987 | McIntyre | F16B 13/045 411/44 |
| 4,806,053 | A * | 2/1989 | Herb | F16B 13/065 405/259.3 |
| 6,234,734 | B1 † | 5/2001 | Klippel | |
| 2005/0025602 | A1 * | 2/2005 | Huang | F16B 13/0858 411/57.1 |
| 2010/0086376 | A1 * | 4/2010 | McClure | F16B 13/124 411/71 |
| 2012/0128443 | A1 * | 5/2012 | Fabre | F16B 5/02 411/44 |

FOREIGN PATENT DOCUMENTS

| | | | |
|---|---|---|---|
| GB | 2421554 A | † | 6/2006 |
| WO | 2010062425 A1 | | 6/2010 |

\* cited by examiner
† cited by third party

CONSTRUCTIVE DISPOSAL APPLIED IN MECHANICAL EXPANSION FIXER FOR METAL STRUCTURES OR THE LIKE

This Patent refers to an Utility Model for a Constructive Arrangement Applied in Expansion Mechanical Fixer for Steel and Related Structures, which presented features serves a practical, efficient and safe union or anchoring between structural elements specifically indicated in tubular profiles, square or different hollow steel sections, where access to the other side of the structure to perform a conventional union is not possible, and may also be in concrete structures where there is the same difficulties, thereby providing a series of advantages inherent to its applicability, and its innovative features in the genre.

As we know, the screw is intended to be the attachment elements of two or more surfaces or combined in different joints, such as wood, drywall (in this case with the use of the adapter sleeve), metal plates or in matrix of matter little hard or hard and may involve the use of nuts or through the combined effect of rotation and pressure (penetration rectilinear progression) in a hole intended solely to receive it, grooved in the opposite direction to the spiral or not.

The function of the screws as construction item or accessory of machines may be the connecting piece, the kinematic mechanism as a movement transformer, or as a multiplier of efforts. In the first case, that is, as the connecting piece, the screw is screwing up the nut, which may be one of the connecting parts (connection of the pieces of structure or pieces of machinery). In the case of motion conversion, one of the parts, the nut or the screw is fixed, moving the other, the rotation motion applied on a straight path, which is passed to transmit, then this movement to the point of application; in the case of opening or closing of a slide valve, of the control of levers, of the press by screws.

With the increasing development of construction methods of steel and with the constant innovation of architectural designers, appear on the market the need for specific fastening systems and pitched for anchoring metal structures on different types of base materials, such as massive concrete, ceramic blocks and bricks, in addition to these materials, there is a need to promote unity or anchoring between metal structures (plates, hollow sections, square sections or other sections).

With this in mind is that the applicant, after several studies and research developed an intelligent and innovative way, the Applied Constructive Disposal in Expansion Mechanical Fixer for Steel Structures or the like, as it serves in a practical, efficient and safe conditions required for the union or anchoring of the metal elements, and which provides significant technical advantages, and which provides facility for applications in tubular, square and hollow steel sections of different profiles; excellent workmanship; high performance in tensile and shear requests, as its components receive heat treatment; eliminates the need for skilled labor or specific permissions to work because installation requires only hand tools. The fixer consists of four distinct parts: a screw hexagonal head provided with full thread, a flat washer, a jacket with hexagon, whose cylindrical body contains four small uni-directional tears, and one finally a cone system guided, which brings a great advantage of the application object of development, because as it pulls the bolt and lock with another tool the jacket with hexagonal, guided cone is high, causing the jacket legs to expand, locking the plate or beam with the hollow profile, this kind of guided cone system prevents the cone to turn in false in the jacket, and its performance is impaired, so the performance is guaranteed safely. The diameters of the fixer and the length may vary according to need for its use.

The method of application of the mechanical expansion fixer, object of request is simple and practical: It is necessary to make a hole with the indicated diameter; then, it must insert the fixer into the hole through the plate or profile; use a wrench to hold the hex shirt and use another key to realize the torque on the bolt, (where is held the torque on the screw, the cone is high, causing the legs of the jacket to expand, locking the plate or beam by the hollow section); after finishing the torque, a locking action is established between the sheet and profile, forming a secure, screw finish connection.

To have a clear view of the Constructive Disposition Applied in the Mechanical Expansion Fixer for metal structures or the like, accompanying the illustrative drawings, to which reference is made in order to better elucidate the detailed description that follows, where:

FIG. 2 is a frontal elevation view of the Constructive Disposition Applied in the Mechanical Expansion Fixer or the like for metal structures or the like;

FIG. 3 is a posterior view of the Constructive Disposition Applied in the Mechanical Expansion Fixer for metal structures or the like;

Figure 1:
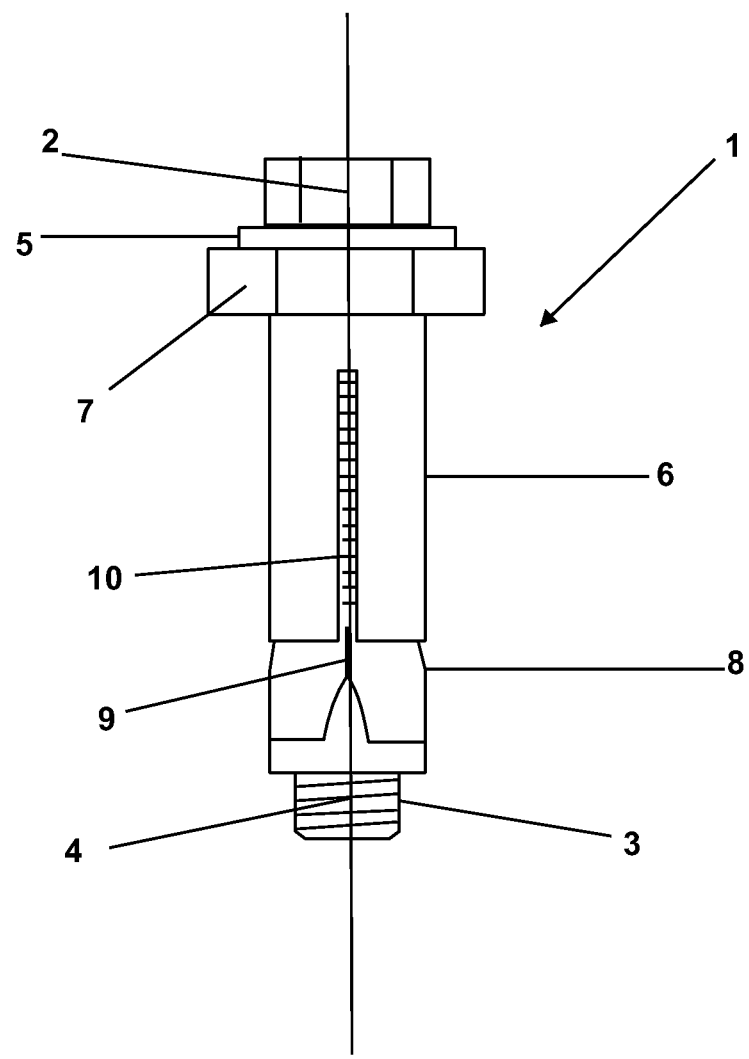
FIG. 1 is side elevation view of the Constructive Disposition Applied in the Mechanical Expansion Fixer or the like for metal structures or the like, showing the components that compose it.
Figure 2:
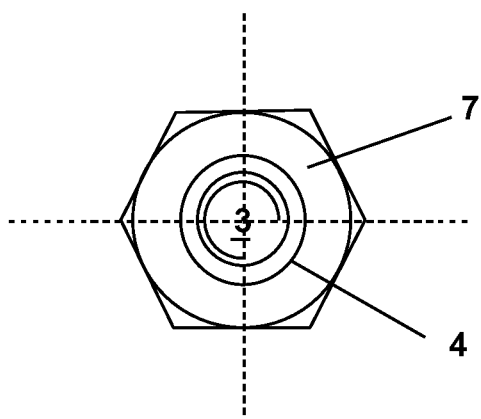
Figure 3:
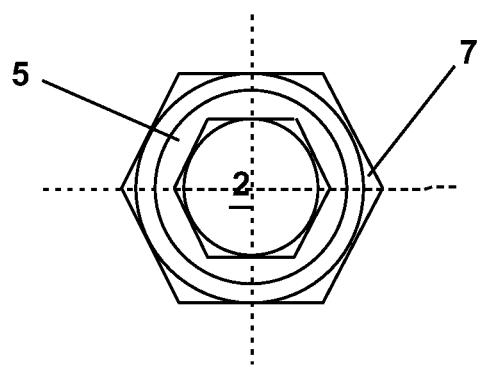
Figure 4:
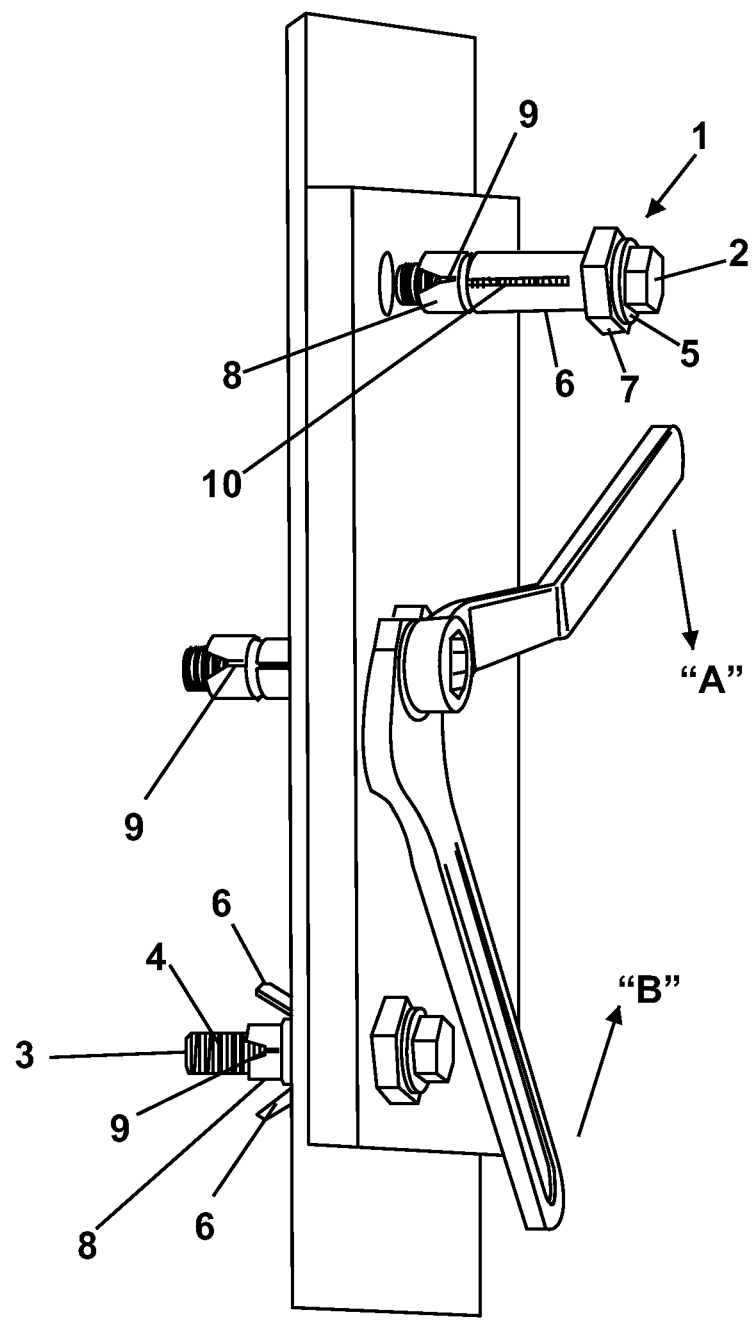
Figure 5:
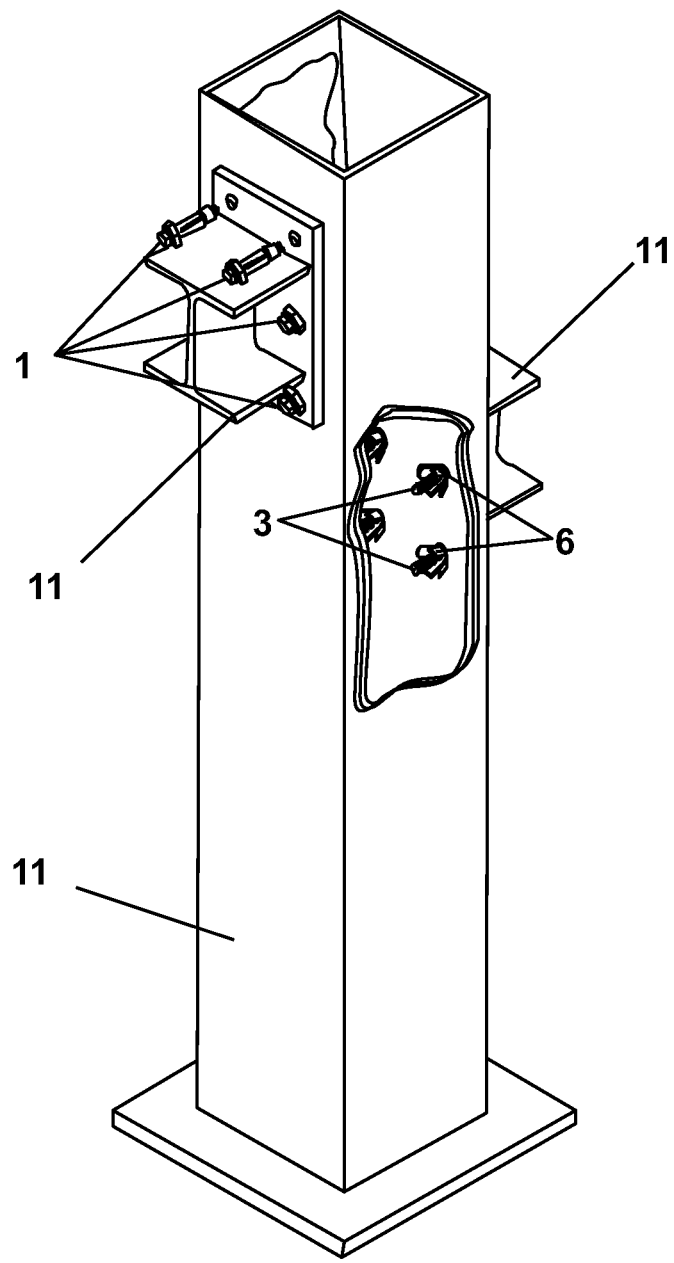

FIG. 4 is a perspective view of the Constructive Disposition Applied in the Mechanical Expansion Fixer for metal or similar structures, showing three different situations of the fixer, the first only the fixer positioned in the bore, the second the use of tools for torque and fixation on the structure and the third fixer already tight in structure; and FIG. 5 is a perspective view of the Constructive Disposition Applied in Mechanical Expansion Fixer for Metal Structures or the like, showing details of the fixing of two profiles "I" in a square profile structure, and may observe the outside side and cutting of the inner side.

According to the illustrations presented and their details, the Constructive Disposition Applied in the Mechanical Expansion Fixer for metal structures or the like, is characterized by being constituted by a set of pieces which forms the mechanical expansion fixer (1), the same has a head with hexagon socket (2) and a cylindrical body (3) provided with full thread (4) has plain washer (5) and a jacket (6) in low carbon steel, provided with heat treated (hardened/temperate) to increase its resistance, creating an element able to support great efforts of traction and shearing. Even in the head of the jacket (6) there is a hexagonal (7) to ensure that the jacket does not rotate during mounting and tightening, which provides a wide contact area option to use the key which holds the fixer (A and B), therefore, it is not necessary to position it in the hole in a specific way, ensuring flexibility in the application. The cone guided (8) is pre-assembled with the assembly being threaded in the thread base of the fixer (1), there is a unique locking system guides (9), these guides fit into the openings or slots of the jacket (10) and prevent the cone rotate to false in the jacket (6), as the head of the hexagon socket (7) when locked with a fixed key or star prevents this condition, this also applies in situations in which the level of friction between the fixer and the base material is reduced, so there is a strong and rigid fixation between the metallic hollow profiles (11) and the fixer (1).

As we have seen, the Applied Constructive Disposal in the Mechanical Expansion Fixer for Metal Structures and Related, strictly meet all the requirements of mechanical tests related to technical standards, fully complying with the goals, performing in a practical and effective way the functions by which it was designed, providing a series of technical and functional advantages to the users, besides the reliability of a sure and steadfast anchor, containing, therefore, particular characteristics, innovative and equipped with basic requirements of novelty.

The invention claimed is:

1. A fastening system comprising:
   a screw with a hexagonal head, the screw having a cylindrical body;
   a thread on the cylindrical body;
   a washer adjacent the hexagonal head; and
   a jacket made of low carbon steel surrounding the cylindrical body, the jacket having a proximal end adjacent the hexagonal head and a distal end adjacent a cone, wherein the jacket is heat-treated to increase its resistance, and the jacket has open slots extending from the distal end to pass a member there through; and
   a cone that is threaded onto the thread, the cone including locking system guides that fit into the distal end of the jacket and protrude through the open slots of the jacket when the hexagonal head is rotated,
   wherein the jacket includes four open slots to receive four locking system guides extending from the distal end.

2. The fastening system of claim 1 further comprising:
   a hexagonal head on the jacket, which is adapted to receive a key that holds the fastening system.

3. The fastening system of claim 1, wherein the locking system guides do not extend an entire length of the cone.

* * * * *